June 29, 1943.  L. BERTELE  2,323,005
PHOTOGRAPHIC CAMERA
Filed Dec. 1, 1939
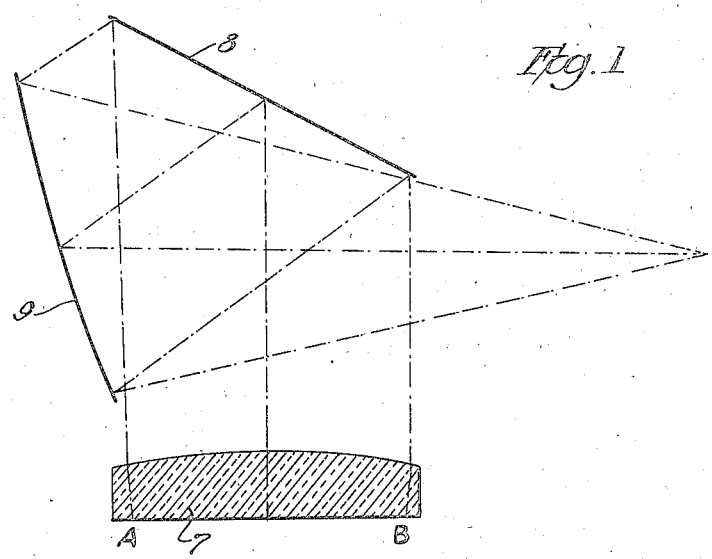
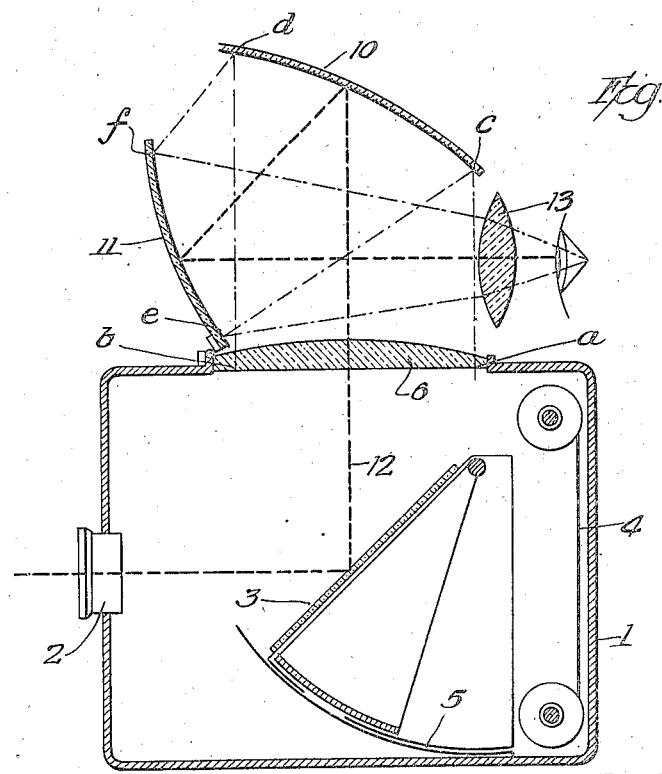
Inventor
Ludwig Bertele
By Singer, Ehlert, Stern & Carlberg
Attys.

Patented June 29, 1943

2,323,005

UNITED STATES PATENT OFFICE 2,323,005

PHOTOGRAPHIC CAMERA

Ludwig Bertele, Dresden, Germany; vested in the Alien Property Custodian

Application December 1, 1939, Serial No. 307,182
In Germany October 6, 1938

4 Claims. (Cl. 88—1.5)

This invention relates to improvements in photographic cameras.

It is particularly directed to improvements in cameras of the reflex type. In cameras of this type, a picture is projected upon a mirror in the interior of the camera, and prior to the exposure the operator views the picture presented by the mirror upon a screen of ground glass which is mounted usually in the top wall of the camera. For making the exposure, the mirror is moved out of the way, permitting the lens to project the picture upon the carrier of sensitized material positioned in the camera.

Similar devices also have been used for finder construction of photographic cameras, and where in the following specification and claims a reference is made to finders, it is to be understood that the term implies the finder construction proper as well as the construction of a camera with a reflecting mirror temporarily interposed between the lens and the sensitized material.

The picture presented by the mirror on the ground glass screen usually is observed from the top, so that the finder can best be utilized when the structure is held approximately at waist level.

Attempts have been made heretofore to convert waist level finders of this type into eye level finders. A pair of reflectors was for this purpose disposed above the ground glass screen in opposition to each other and in acute angle relation to each other with one of the reflectors in position to receive the picture of the screen to reflect this picture into the companion reflector which reflected it horizontally outwardly into the eye of the observer.

The eye of the observer in finders of this type is at considerable distance from the glass screen. Owing to this distance it is not feasible to place in front of the eye a magnifying lens of short focal length. This lens cannot be positioned so close to the screen to permit the picture to be viewed therethrough.

In order to reduce the effective distance between the eye and the ground glass screen, it had also been suggested to interpose a glass prism or the like between the magnifying lens and the glass screen. This arrangement has the disadvantage of increasing the weight and of permitting direct observation of the screen picture solely after the prism had been removed.

The present invention has the object of improving reflex cameras or finders of this type by permitting the picture of the ground glass screen to be observed at eye level.

Another object of the invention is to provide a camera or finder of this type in which the picture projected by the mirror and directed by the reflectors into the eye of the observer is a picture which is of uniform luminosity.

In order to attain these improvements, it is an object of the invention to provide a reflector system of this character having at least one concave reflector whereby the picture in the lens of the camera is reproduced, and whereby any reversion of this picture may eventually be overcome by additional lenses, projecting an upright and laterally non-inversed picture into the eye of the observer.

Another object of the invention is to provide reflectors in such opposition and acute angle relation to each other that disturbing astigmatic aberrations are avoided.

The invention, employing one or more concave reflectors for the observation of the picture projected onto the ground glass screen by the mirror of the finder, also has the object of utilizing the concave reflectors for reproducing the picture projected from the lens of the finder in a better way than this picture would be observable through an ordinary magnifying glass or lens of short focal length.

It is well known that the dispersion of the light through a ground glass screen is a dispersion over a relatively small angle. The main portion of the light passes straight through the ground glass screen. The dispersion of the ground glass will be reduced in proportion to the fineness of the grain on the ground surface. In modern miniature cameras the user observes the picture of the finder in greatly magnified condition. The enlargement of the picture would also cause the grain of the ground glass to appear greatly magnified and it is for this reason that the screen must be of very fine grain. Where it is desired to obtain a picture of uniform luminosity—even in the very corners—the dispersing action of the ground glass screen may be neglected as a disturbing factor.

In order to produce the same enlargement of the picture in the two principal meridians of the reflectors and in order to eliminate astigmatic defects which might be present, the invention also has the object of providing one or both of the concave reflectors with a reflecting surface which is not a true rotary surface produced by the rotation of a generatrix about a fixed axis. The concave reflecting surface is then preferably a surface of toric concavity having different curvatures in the two main sections. By suitably selecting the curvatures in these main sections, all of the astigmatic defects may be absolutely eliminated.

It is also feasible, according to the invention, to eliminate the astigmatic aberrations by additionally employing a magnifying glass having a cylindrical curvature.

The invention also has the object of selecting the curvature of the two reflectors or the curvature of at least one of the reflectors so as to obtain approximately uniform rates of ocular accommodation over the entire field.

When in the system of the present invention, the reflectors are formed as a plane and a concave reflector, it will be seen that the enlargement of different portions of the picture is not a uniform one over the entire area of the picture. Depending upon the greater or smaller distance of that portion of the concave mirror which is effective for the reflection from that portion of the image which is to be viewed, the portion of the picture will appear more magnified or less. The impression of the entire picture presented by the reflector is that of a distorted picture on an area of approximate trapezoidal formation. This disturbing condition is avoided or at least considerably relieved by using two concave reflectors instead of a plane reflector and a companion concave reflector. Upon using a pair of concave reflectors, the distorting qualities in the second reflector will be inversely effective as compared with those of the first reflector. The result of these two similar and inverse distortions is then a picture which practically is without distortion, but enlarged.

Two embodiments are illustrated by way of example in the accompanying drawing:

Fig. 1 shows diagrammatically a pair of reflectors associated with a ground glass screen, one reflector being plane while the other one is concave.

Fig. 2 shows in section diagrammatically an embodiment with two concave reflectors associated with a camera.

The camera casing 1, Fig. 2, is provided with a lens 2 and contains a mirror 3. As in other reflex cameras the mirror normally reflecting the picture projected onto it by the lens may rapidly be swung out of the way to permit the light to act on the film 4. A shutter 5 diagrammatically indicated in Fig. 2 also may be moved with the mirror to operative (exposure) or inoperative position. The mirror 3 in operative (finder) position reflects the picture onto the lower ground face of a ground glass screen 6 mounted in the top wall of the casing. This screen is here shown in the form of a lens to display the picture in magnified condition when viewed from the top. A large portion of the light reflected by the mirror passes—with very little dispersion—straight through the ground glass screen 6.

In Fig. 1, the casing, mirror and lens are not shown. It is solely the combination of the reflectors and screen which are of interest. This combination permits the picture to be observed by viewing it in a direction parallel to the axis of the lens, as in eye level finders.

The ground glass screen 7, Fig. 1, may receive the picture projected from the plane mirror 3, Fig. 2. The plane reflector 8 is located spaced from the surface of the glass screen 7 in such angular position that it receives that picture which passes straight through the ground glass screen 7. In opposition to the plane reflector 8 and at acute angle relation thereto, there is shown a concave reflector 9 having a relatively strong curvature, the radius of curvature being four to five times the distance between the end points of the picture projected onto the screen 7. The rays of light reflected from the plane reflector 8 are again reflected by the concave reflecting surface 9, the reflected picture appearing enlarged on this reflecting surface 9. Upon properly selecting the curvature of the concave reflecting surface 9, astigmatic defects may be eliminated.

It is obvious that by looking past the lower edge of the first reflector 8 in a direction parallel to the axis of lens 2, this enlarged picture may be viewed by an observer.

In Fig. 2 the means for permitting inspection of the finder picture at eye level are formed by two concave reflectors 10 and 11. The projection of the finder picture may be traced by the heavier line 12, Fig. 2, but while in Fig. 1, the plane reflector 8 reflected the rays parallel to each other, in Fig. 2, the curvature of reflector 10 causes the rays to be deflected angularly onto the companion concave reflector 11 which directs the rays of light into the magnifying lens 13 located below the margin of the first reflector 10 and in a suitable position for close approach to the eye of the observer. In this manner the picture will be presented to the eye additionally enlarged by the lens 13, when the finder is used as an eye level finder.

That portion of the picture which is located at or about the point $a$ of the screen 6, is reflected from the reflector 10 at or about the point $c$. That part of the picture of the screen 6 which is adjacent or at the point $b$ will be reflected at or about the point $d$ of the reflector 10. From these points of the reflector 10, the light is reflected to the points $e$ and $f$ respectively of the reflector 11. But since the distance from point $a$ of the screen to point $c$ of the reflector is smaller than the distance from point $b$ of the screen to point $d$ of the reflector, the magnifying effect of the reflector 10 with respect to the picture point $a$ will be less (at or about the point $c$) than it will be at or about the point $d$ with respect to the picture point $b$.

Now, in the second concave reflector 11 that part $e$ of the reflector which is utilized for reflecting the point $a$ of the screen picture has a greater total distance from point $a$ than the total distance of the picture point $b$ from the reflector point $f$. The enlarging conditions, therefore, on the two reflectors are inverted with respect to the end points $a$ and $b$ respectively of the picture, with the result that the over-all enlargement is uniform or approximately uniform with respect to these and all other points of the picture.

I claim:

1. In a photographic view finder in which the image appears on a horizontal translucent screen, a mirror mounted above said translucent screen in such an angular position so as to reflect the image downwardly and forwardly, and a second mirror arranged in the path of the light rays reflected from said first mirror for reflecting the image substantially horizontally rearwardly past the lower edge of said first named mirror and above said translucent screen, said mirrors having their lower edges disposed to the rear of their respective upper edges, with said upper edges being closer together to form an acute angle between said mirrors, the said second mirror having a concave reflecting surface and its upper edge being positioned at a substantially higher plane than the lower edge of said first named mirror while its lower edge is not lower than the plane of said screen.

2. In a photographic view finder in which the image appears on a horizontal translucent screen, a concave mirror mounted in spaced relation above said translucent screen in such an angular position so as to reflect the image downwardly and forwardly, and a second concave mirror arranged in the path of the light rays reflected from said first mirror to reflect the image enlarged horizontally rearwardly past the lower edge of said first named mirror, said mirrors having their lower edges disposed to the rear of their respective upper edges, with said upper edges positioned closer together so as to form an acute angle between said mirrors, the said second mirror being positioned with its upper edge at a substantially higher plane than the lower edge of said first named mirror with its lower edge above the area of the screen.

3. In a photographic view finder in which the image appears on a horizontal translucent screen, a concave mirror mounted in spaced relation above said translucent screen in such an angular position so as to reflect the image downwardly and forwardly, and a second concave mirror arranged in the path of the light rays reflected from said first mirror to reflect the image enlarged horizontally rearwardly past the lower edge of said first named mirror, said mirrors having their lower edges disposed to the rear of their respective upper edges, with said upper edges positioned closer together so as to form an acute angle between said mirrors, the reflecting surface of at least one of said mirrors being torically curved, the said second mirror being positioned with its upper edge at a substantially higher plane than the lower edge of said first named mirror and with its lower edge directly above the area of the screen.

4. In a finder of the class described, the combination of a horizontally disposed translucent screen, two mirrors facing each other and arranged above the screen, both being inclined in the same general direction with respect to the screen with their lower edges disposed to the rear of their respective upper edges and being inclined with respect to each other so that their upper edges are closer together to form an acute angle between said mirrors, at least one of the mirrors being a concave mirror, both mirrors having their lower edges at different heights above the screen and within the area of the screen, and a magnifying lens interposed between the plane of the screen and the lower edge of the mirror disposed at a higher elevation above the screen, to permit observation of the picture reflected by the other mirror through said lens.

LUDWIG BERTELE.